United States Patent [19]

Rafferty

[11] Patent Number: 4,968,057

[45] Date of Patent: Nov. 6, 1990

[54] COVER ASSEMBLY FOR AN AIRBAG UNIT

[75] Inventor: Scott Rafferty, Dover, N.H.

[73] Assignee: Davidson Textron Inc., Dover, N.H.

[21] Appl. No.: 448,512

[22] Filed: Dec. 11, 1989

[51] Int. Cl.⁵ .............................................. B60R 21/08
[52] U.S. Cl. ..................................... 280/731; 280/732
[58] Field of Search ................ 280/730, 731, 732, 743

[56] References Cited

U.S. PATENT DOCUMENTS

| 4,334,699 | 6/1982 | Patzelt et al. | 280/731 |
| 4,752,083 | 6/1988 | Honda | 280/731 |
| 4,810,005 | 3/1989 | Föhl | 280/732 |
| 4,878,689 | 11/1989 | Mitzkus et al. | 280/731 |

Primary Examiner—Charles A. Marmor
Assistant Examiner—Michael Mar
Attorney, Agent, or Firm—John C. Evans

[57] ABSTRACT

A cover for an airbag unit includes first and second separate door members each having a polyvinyl chloride outer shell, a urethane foam pad and a yieldable thin metal back plate with a side flange connecting each of the first and second door members to an airbag housing to define a soft-feel horn hub within a steering wheel having a styling line thereacross; the two members are adhered to a rigid urethane foam member to prevent separation therebetween. The rigid urethane foam member fills between the door members and the airbag unit such that deployment of the airbag unit will immediately impact thereon to cause the thin metal back plates to hinge outwardly with respect to the housing to open the two separate door members for airbag deployment.

4 Claims, 1 Drawing Sheet

COVER ASSEMBLY FOR AN AIRBAG UNIT

FIELD OF THE INVENTION

This invention relates to passenger side airbags for vehicles and, more particularly, to a cover for such airbag units.

DESCRIPTION OF THE RELATED ART

Driver's side airbag units are integrated into a steering wheel and incorporate a housing for a gas generator, a sensor to trigger the gas generator upon vehicle impact, an airbag inflatable by the gas generator, and a cover to enclose the airbag and form a horn pad within the wheel of a steering wheel assembly. In such arrangements, it is known to inject plastic such as TPE (Thermoplastic Elastomer) and TPO (Thermoplastic Olefin) to form a substrate for a vinyl covered horn pad and airbag cover. Such covers may produce debris when the vinyl cover is ruptured during airbag deployment.

Other covers are made of injection molded TPE/TPO materials. Such covers have a hard, board-like feel. Furthermore, it is known to provide vinyl covered substrates. The vinyl cover is perforated to separate when the airbag is inflated to impact thereagainst. In such arrangements, the outer shell or cover may tear and produce broken fragments that are propelled by inflation and deployment of the airbag into the vehicle compartment.

An example of such an airbag cover is set forth in U.S. Pat. No. 4,752,083 having a cover with an outer shell member which is weakened at sections thereon to produce separation of the cover when the airbag is deployed thereagainst.

U.S. Pat. No. 4,810,005 discloses an inflatable airbag unit which is sealed by a cover including two rectangular foam plastic doors. The rectangular foam plastic doors are connected together at one end thereof and are connected to a generator housing by means of separate flexible straps.

Similarly, a cap-like cover member for an airbag installation is disclosed in U.S. Pat. No. 4,334,699. The cover member has an integral break line that separates on airbag deployment to form two flaps. The flaps are formed in part by a fabric insert which defines a hinge about which the two flaps are moved upwardly of the steering column and steering wheel into an airbag deployment position.

SUMMARY OF THE INVENTION

An object of the present invention is to provide an improved airbag cover assembly for an airbag unit; the airbag cover assembly movable into an open, deployed position without producing debris at the outer surface of the cover assembly.

Another object of the present invention is to provide an improved cover assembly for an airbag unit including a pair of separate door members each having a foam plastic pad, a polyvinyl shell covering the outer surface of the cover assembly, and a thin metal plate bonded to the inboard surface of each of the foam plastic pads with an integral, yieldable flange thereon joined to a housing for the airbag unit and operative to hinge the door members during airbag deployment and wherein the door members are pressed into a rectangular frame to form a cover having a styling line thereacross; and a spacer member inboard of the thin metal plates bonded thereto for holding the first and second door members together to prevent separation therebetween at the styling line.

Yet another object of the present invention is to provide an improved cover assembly for a driver's side airbag unit located at the upper end of a steering wheel column including a pair of separate soft-feel door members supported on the housing for the airbag unit to be opened with respect thereto for deployment of the airbag and including first and second foamed outer shell components that are separated from one another to provide for such opening movement without forming debris particles from the outer surface material of the soft-feel door members.

A still further feature is to provide an improved cover assembly as set forth in the preceding object wherein a spacer is provided between the inboard surface of the foamed outer shells and the airbag unit to direct a release force on the cover assembly during initial inflation of the airbag and wherein the spacer holds the pair of foamed shell components together at a style line prior to opening movement of the cover assembly on initial deployment of the airbag.

These and other objects of the invention will be more apparent when taken in conjunction with the following detailed description of the invention along with reference to the accompanying drawings wherein:

DETAILED DESCRIPTION OF THE PREFERRED EMBODIMENT

Figures 1, 2:
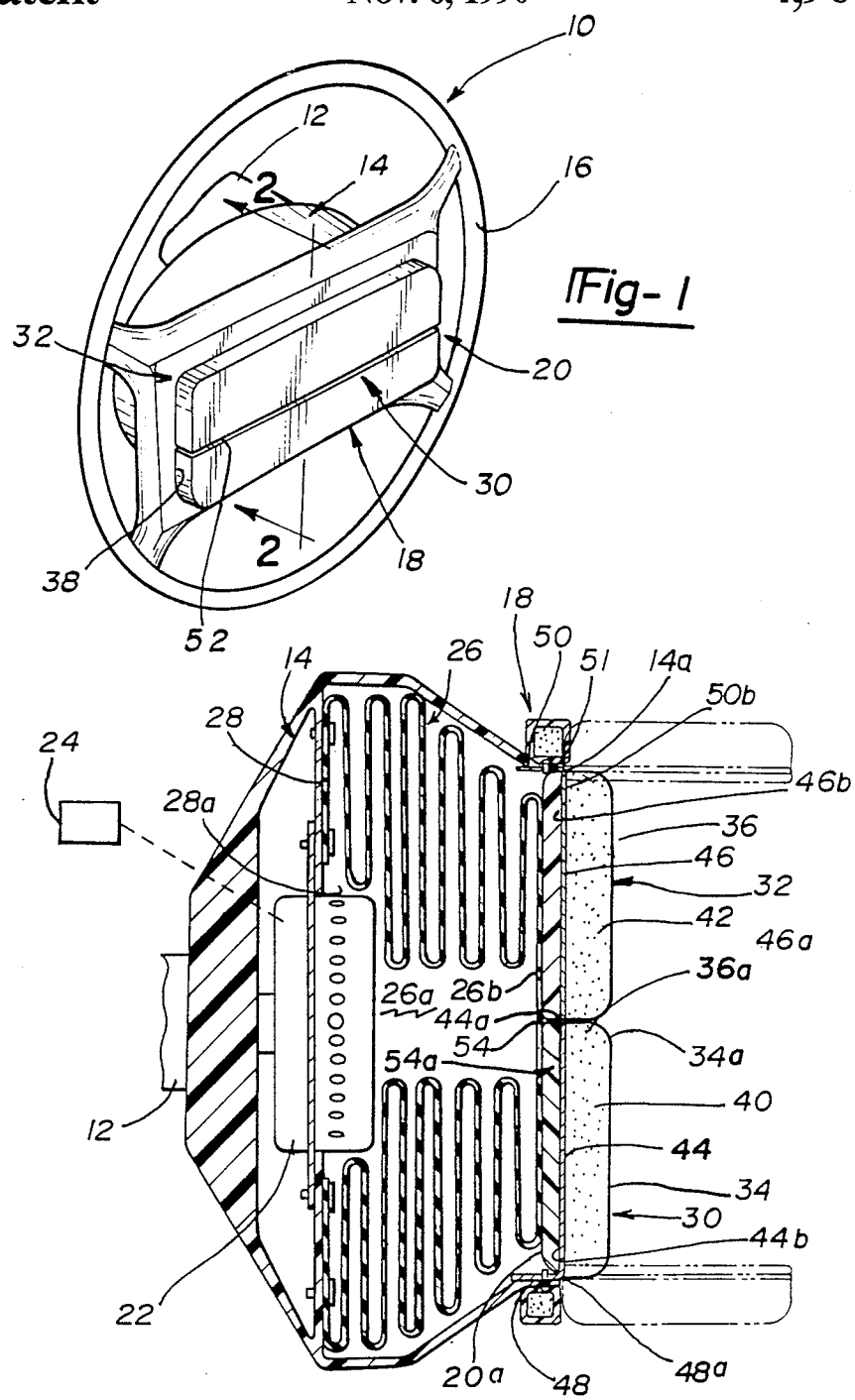
FIG. 1 is a perspective view of a steering wheel assembly including the airbag cover of the present invention.
FIG. 2 is an enlarged sectional view taken along the line 2—2 of FIG. 1, looking in the direction of the arrows.

FIG. 1 shows a steering wheel assembly 10 having a steering column 12 connected to an airbag unit housing 14 surrounded by a steering wheel 16. The steering wheel 16 is connected to a rectangular hollow frame 18. The rectangular hollow frame 18 supports a cover assembly 20 of the present invention.

More particularly, the airbag unit housing 14 encloses a gas generator 22 that is operative in a known manner to generate a charge of gas when an impact sensor 24 directs a signal thereto upon vehicle impact. The gas generator 22 directs inflatant material to an inflatable airbag 26. The airbag 26, in FIG. 2, is shown in a collapsed position within the housing 14. It includes an inboard end 28 defining a passage 28a for flow of the inflatant from the gas generator 22 into the interior 26a of the airbag. The airbag also includes an outboard end 26b thereon which is in engagement with the inboard surface 20a of the cover assembly 20.

In accordance with the present invention, the cover assembly 20 more particularly includes a first door member 30 and a second door member 32. The first door member 30 includes a first outer shell 34 of a flexible thermoplastic material such as polyvinyl chloride, polypropylene or polyethylene. The second door member 32 includes a second outer shell 36 of the same material. The first and second outer shells, while being disclosed as fabricated from thermoplastic material, can also be made of any other outer covering having a desired finished appearance and a soft-touch feel at a center horn pad region 38 of the rectangular hollow frame 18.

For purposes of illustration, the horn components are omitted, but it should be understood that they can be embedded in low modulus elastomer cores 40, 42 formed as pads located behind each of the first and second outer shells 34, 36, respectively, to form a soft touch feel at the horn pad region 38. Examples of a suitable low modulus elastomer is a reaction injection molded urethane having a flexural modulus in the range of $20-80 \times 10^3$ psi at 75° F., or urea or microcellular urethane foam (RIM) material.

Each of the foam pads 40, 42 are backed by thin metal sheets, preferably aluminum, 44, 46, respectively. The thin metal sheet 44 includes a vertical side flange 48 thereon and the thin metal sheet 46 includes a vertical side flange 50 thereon. The vertical side flanges 48, 50 are connected by suitable fasteners such as rivets 51 to the outboard end 14a of the airbag unit housing 14.

The thin metal plates 44, 46 bend at the side flanges 48, 50 when the airbag 26 is deployed to define a hinge point at 48a and 50b to move the first and second door members 30 and 32 from the closed position shown in FIG. 2 to an open position shown in broken outline therein.

In accordance with certain principles of the present invention, each of the shells 34, 36 and the thin metal plates 44, 46 have end surfaces 34a, 36a, 44a and 46a that define an open styling line 52 between the first and second door members 30, 32 which extends across the full width of the cover assembly 20, as shown in FIG. 1.

More particularly, the open styling line 52 has the end surfaces 34a and 36a completely separated throughout their full depth, as shown in FIG. 2. Additionally, the thin metal plates 44, 46 are completely separated at the ends 44a and 46a thereof, respectively. Consequently, there are no fragments produced at the outer surface of the first and second outer shells 34, 36 as the first and second door members 30, 32 are moved from their closed position to their open position upon deployment of the airbag 26 from the airbag unit housing 14.

Another feature of the present invention is that a substrate or spacer 54 is bonded to the inboard surfaces 44b and 46b of the thin metal plates 44, 46 to prevent the end surfaces 34a and 36a thereon and end surfaces from separating during use to produce an undesirable gap at the open styling line 52. The spacer 54 also is arranged to fill a gap between an undeployed airbag unit at the outboard end 26b thereof and the inboard surfaces 44b and 46b of the metal plates 44, 46 so that the doors will immediately open upon initial inflation of the airbag unit, rather than requiring movement of the airbag unit through a gap prior to opening movement of the doors.

The spacer 54 is preferably manufactured from a rigid structural foam urethane material, e.g., a reaction injection molded (RIM) urethane material having a flexural modulus in the range of $200-300 \times 10^3$ at 75° F. and an elongation percent less than 10%. The spacer includes a break line 54a therealong which will separate upon initial inflation of the airbag 26. There is a slight amount of rigid foam tearing at the break line 54a. However, the force required for such tearing is much less than that required to tear injection molded TPE materials or vinyl covers backed with TPE/TPO materials. Also, very little debris is produced by such tearing action in such rigid foam spacers 54. Other examples of such rigid foam materials include SMA (styrene maleic anhydride) foam materials, rigid olefinic (polypropylene, polyethylene) foam materials, urethane LDRR (low density rigid RIM) foam materials.

While the foregoing is a complete description of a preferred embodiment of the present invention, it should be understood that various changes and modifications may be made without departing from the spirit and broad scope of the present invention. The invention is limited only by the scope of the following claims.

What is claimed is:

1. A cover for a driver side airbag assembly, said airbag assembly including a housing, a gas generator located in the housing and an inflatable airbag communicating with the generator for receiving an inflatant therefrom in response to vehicle impact, the cover comprising:

first and second door members, each of said first and second door members including an interior core of high modulus elastomer having an inboard surface and an outboard surface;

a thermoplastic shell covering said outboard surface of each of said interior cores and having end surfaces thereon defining an open styling line between said first and second door members;

a thin metal plate bonded to said inboard surface of each of said interior cores and including a side flange thereon directed at right angles to the inboard surface of each of said interior cores;

means for fixing each of said side flanges to the housing, the intersection of said side flanges with said metal plates defining hinge points for deployment of said doors;

a rigid foam substrate bonded to the inboard surface of said thin metal plates and extending across the extent of said first and second door members to prevent separation of the open styling line formed therebetween said rigid foam substrate having a break line extending thereacross in alignment with said open styling line.

2. The cover of claim 1, characterized by:

means forming a rectangular support frame for said first and second door members, said first and second door members being located within said rectangular support frame and for positioning said rigid foam substrate vertically to fill the space between said first and second door members and the inflatable airbag so as to cause inflation of the airbag to immediately exert a force on the rigid foam substrate to cause it to break and to cause the flanges of said thin metal plate to bend and said first and second door pieces to swing open for deployment of the airbag.

3. A cover for an airbag assembly, said airbag assembly including a housing mounted on the upper end of a steering assembly and inboard of a steering wheel coupled to the steering assembly by the housing, a gas generator located in the housing and an inflatable airbag unit communicating with the generator for receiving an inflatant therefrom in response to vehicle impact and the inflatable airbag unit vertically spaced from the cover when deflated; the cover comprising:

first and second door members, each of said first and second door members including a urethane foam pad having an inboard surface and an outboard surface;

a thermoplastic shell covering said outboard surface of each of said pads to define a soft horn pad surface inboard of the steering wheel having an open styling line therebetween;

a pair of thin metal plates bonded to said inboard surfaces of each of said urethane foam pads; each of said thin metal plates including a side flange thereon directed at right angles to the inboard surface of each of said urethane foam pads; and means for fixing each of said side flanges to the housing, the intersection of said side flanges with said metal plates defining hinge points for deployment of said doors a rigid plastic foam substrate bonded to the inboard surfaces of said thin metal plates and extending across the extent of said first and second door members to prevent separation of said first and second door members at said open styling line said rigid foam substrate having a break line extending thereacross in alignment with said open styling line.

4. The cover of claim 3, characterized by:

means forming a rectangular support frame for said first and second door members, said first and second door members being located within said rectangular support frame for positioning said rigid urethane foam substrate vertically to fill the space between said first and second door members and the deflated airbag so as to cause inflation of the airbag to immediately exert a force on said rigid foam substrate to cause it to break and to cause the flanges of said thin metal plates to bend and said first and second door members to swing open for deployment of the airbag.

* * * * *